US006318862B1

(12) United States Patent
Sarayeddine

(10) Patent No.: US 6,318,862 B1
(45) Date of Patent: *Nov. 20, 2001

(54) PROJECTION SYSTEM EMPLOYING MULTIPLE BEAM REFLECTIONS

(75) Inventor: Khaled Sarayeddine, Nouvoitou (FR)

(73) Assignee: Thomson Multimedia, Bouldgne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,306

(22) Filed: Jun. 2, 1998

(30) Foreign Application Priority Data

Jun. 10, 1997 (FR) .................................................. 97 07178

(51) Int. Cl.$^7$ ............................. G03B 21/14; H04N 5/74; H04N 5/64
(52) U.S. Cl. ................................ 353/20; 353/74; 353/77; 348/767; 348/836
(58) Field of Search ................................ 353/37, 20, 74, 353/77, 78; 359/487, 488; 348/752, 762, 767, 788, 789, 782, 836

(56) References Cited

U.S. PATENT DOCUMENTS

| 5,557,343 | * | 9/1996 | Yamagishi | 348/781 |
| 5,573,324 | * | 11/1996 | De Vaan | 353/77 |
| 5,734,447 | * | 3/1998 | Loiseaux et al. | 349/5 |

FOREIGN PATENT DOCUMENTS

| 0 488 590 A1 | 6/1992 | (EP) | G02B/27/00 |
| 0 665 460 A2 | 8/1995 | (EP) | G03B/21/00 |
| 0 657 769 A1 | 6/1995 | (EP) | G03B/21/10 |
| 0 736 795 A1 | 10/1996 | (EP) | G03B/21/10 |
| 0 783 133 A1 | 7/1997 | (EP) | G03B/21/60 |
| 0 648 048 A1 | 4/1995 | (EP) | H04N/5/74 |

* cited by examiner

Primary Examiner—Russell Adams
Assistant Examiner—Khaled Brown
(74) Attorney, Agent, or Firm—Joseph S. Tripoli; Joseph J. Laks; Joseph J. Kolodka

(57) ABSTRACT

A projection system includes a projector for emitting a light beam; a screen and a first medium for converting a linear polarized form of the light beam from the projector to a quasi-circular polarized form of the light beam polarized in a first circular sense. The projector also includes a mirror for reflecting and phase shifting a quasi-circular polarized form of the light beam to a circular polarized sense substantially opposite of that exhibited by the light beam before being reflected by the mirror, and a second medium optically disposed between the mirror and the screen and for selectively converting the light beam between linear polarization and quasi-circular polarization. The projection system also includes a reflective linear polarization filter optically disposed between the second medium and the screen and for reflecting the light beam exhibiting linear polarization of a first linear sense and transmitting the light beam exhibiting linear polarization of a second linear sense substantially perpendicular to that of the first linear sense.

7 Claims, 1 Drawing Sheet

PROJECTION SYSTEM EMPLOYING MULTIPLE BEAM REFLECTIONS

BACKGROUND OF THE INVENTION

The present invention relates to a projection system, more particularly to a system known as a back-projector. The back-projectors currently available on the market are systems which use CRT-based projectors or liquid crystal projectors as projector. However, the present invention can be applied to all types of projection systems.

A back-projector of known type comprises a projector emitting a light beam, a screen and means for sending the light beam to the screen. Currently, the means making it possible to send the light beam to the screen consist of plane mirrors arranged in such a way as to reflect the entire light beam over the whole surface of the screen while limiting the overall thickness of the various elements which have to be inserted into a housing of limited thickness. When a system of mirrors such as mentioned above is used, it is difficult to produce a wide screen, especially a 46-inch screen, since in this case the thickness of the projector remains too great.

A back-projector comprising means making it possible to fold the beam output by the projection objective in order to reduce the depth has therefore been proposed in European Patent Application No. 96402512.6 filed in the name of the Applicant.

As represented in FIG. 1, the projection system described in this patent application includes a projector 1 which can, for example, be a liquid crystal projector emitting a light beam 2 which is already linearly polarised. This beam 2 is sent to a quarter-wave plate 3 in such a way as to produce circularly polarised light. This circularly polarised light is transmitted through a cholesteric filter 4. To do this, the light is right-circularly polarised if cholesteric filters which reflect left-circularly polarised light are used. The beam transmitted through the filter 4 is then reflected off the plane mirror 5. During this reflection, the beam undergoes a phase shift of π, and it is then left-circularly polarised. The beam leaving the plane mirror 5 then encounters the cholesteric filter 4. Since the cholesteric filter reflects all left-polarised light, the light issuing from the mirror is returned to the mirror 5 where it undergoes a new phase shift of π. The reflection off the plane mirror therefore converts left-polarised light into right-polarised light, which is then transmitted in full by the filter 4 to the screen, not represented.

In the system described in this patent application, three reflections take place, two off the plane mirror and one off the cholesteric filter, as represented clearly in FIG. 1. In European Patent Application No. 96402512.6, use is made of cholesteric filters or more generally polarisation filters which reflect light circularly polarised in a second sense opposite to the first sense, to obtain a projection system of small thickness. Now, the cholesteric filters currently available on the market have a number of constraints, especially as regards angle of incidence.

Now, reflective linear polarising filters have recently appeared on the market. These filters transmit linearly polarised light with little loss and reflect light polarised perpendicularly to the transmitted direction. However, in this case, a straightforward reflection off a mirror is not sufficient to reverse the state of polarisation. It is necessary to pass via a quasi-circular state in order for a mirror to give the polarisation from one linear state to another. The purpose of the present invention is to propose a projection system of the type described above, according to a structure which avoids stray reflections.

SUMMARY OF THE INVENTION

Thus, the subject of the present invention is a projection system of the type comprising:
 a projector emitting a light beam,
 a means for converting linear polarisation into quasi-circular polarisation;
 a reflective linear polarising filter;
 a mirror, and
 a screen,
 the light beam arriving at the mirror being quasi-circularly polarised,
 characterized in that the means for converting linear polarisation into quasi-circular polarisation is associated with the reflective linear polarising filter.

According to another characteristic, if the beam output by the projector is linearly polarised, it passes through a second means for converting linear polarisation into quasi-circular polarisation.

Preferably, the means for converting linear polarisation into quasi-circular polarisation is cemented or laminated to the filter.

According to another characteristic of the present invention, the system additionally includes an absorbing linear polarising filter positioned at the output of the reflective linear polarising filter, the passing axis of the absorbing filter being parallel to the passing axis of the reflective filter.

According to yet another characteristic of the present invention, the system also comprises a shutter film positioned at the exit of the screen, the said film exhibiting a small angular acceptance and being centred on a mean angle of incidence which varies as a function of position on the screen. The principal purpose of the film is to absorb the stray images and hence to improve the contrast.

BRIEF DESCRIPTION OF THE DRAWINGS

Other characteristics and advantages of the present invention will emerge on reading the description of various embodiments, this description being given with reference to the appended drawings in which.

To simplify the description, in the figures the same elements bear the same references.

DESCRIPTION OF PREFERRED EMBODIMENTS

The present invention uses the properties of reflective or non-absorbing linear polarising filters.

Figure 2:
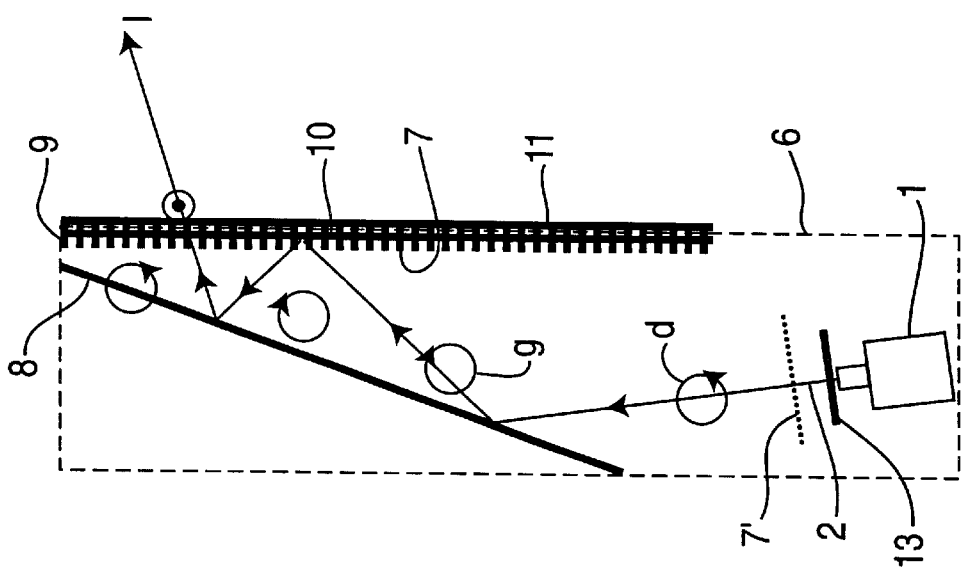
FIG. 2 is a schematic sectional view of a preferred embodiment of a projection system according to the present invention.
Figure 1:
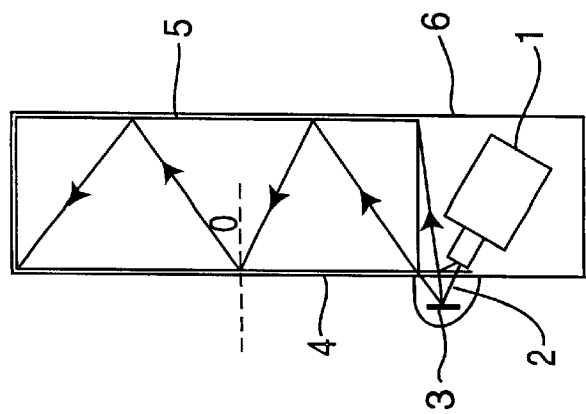
FIG. 1, already described, is a schematic sectional view of a back-projector using polarisation filters consisting of cholesteric filters, according to the prior art.

Thus, as represented in FIG. 2, a projection system in accordance with the present invention comprises a projector 1, such as for example a liquid crystal projector which emits a linearly polarised light beam 2. This projector is associated with a means 7' for converting linear polarisation into quasi-circular polarisation, this means preferably being a quarter-wave plate, and a reflective linear polarising filter 9. In this system and as represented in FIG. 2, the linearly polarised beam passes firstly through the quarter-wave plate 7' in such a way as to obtain a quasi-circularly polarised beam, namely one exhibiting right circular polarisation, as referenced by d. This beam will be reflected off the mirror 8 where it undergoes a first phase shift of π and gives a left circularly polarised beam g.

The principle described above can be implemented according to various embodiments. A preferred embodiment of the invention is represented in FIG. 2. In this case, the projector 1 located inside the chassis 6 is a liquid crystal projector which emits a linearly polarised light beam through a first quarter-wave plate 7' which converts this linear polarisation into quasi-circular polarisation, for example right circular polarisation, as referenced d, so that the beam may firstly be reflected off a mirror 8. The mirror 8 is a plane mirror such as a mirror consisting of a sheet of aluminium which reflects light circularly polarised in a certain sense as light polarised in the reverse sense, namely exhibiting a phase shift of substantially π, as represented clearly in FIG. 2 by the circles d and g in accordance with the invention, a means for converting linear polarisation into quasi-circular polarisation, consisting for example of a quarter-wave plate 7, is bonded or placed parallel to a reflective linear polarising filter 9 placed parallel to the display screen 11. The left circularly polarised beam passes through the quarter-wave plate 7 so as to obtain a linearly polarised beam. The light beam thus arrives at the filter 9 where it is reflected towards the quarter-wave plate 7. On passing through this quarter-wave plate again, the beam changes from linearly polarised to left circularly polarised, as represented in FIG. 2. It will then be reflected off the mirror 8 where it undergoes a new phase shift of π to give a right circularly polarised beam. The beam thus polarised passes through the quarter-wave plate where it is converted into a linear polarisation perpendicular to the first linear polarisation and, therefore, it can pass through the polarising filter 9, as represented in FIG. 2 by the arrow I. Preferably, the quarter-wave plate 7 is adhesively bonded or laminated to the polarising filter 9. This makes it possible to reduce or correct the phase shift introduced during the reflection off the metal mirror which is due to the angle of incidence and also to the embodiment of the mirrors, these being made from aluminium sheets provided with dielectric layers in order to increase the reflectivity, especially in the blue range, these layers also introducing some phase shift. The metal mirror 8 therefore introduces a variable phase shift, the effect of which is to convert circular polarisation into elliptical polarisation. Therefore, the polarisation on the linear polarising film is, also, elliptical. There is another means of correcting the phase shift. This means consists in positioning the first quarter-wave plate 7' in such a way that it makes an angle θ with the optical axis of projection different from 90° so as to give a different phase shift for each ray.

The projector referred to in the above description was a liquid crystal projector giving a linearly polarised beam as output. In the case in which a projector giving an unpolarised beam as output is used, an optional means (13) is provided for polarising the beam linearly, this means being positioned ahead of the quarter-wave plate (7, 7'). By way of example, a reflective linear polarising filter which is particularly beneficial in respect of the embodiments described above consists of the film sold by the "3M" company under the brand name DBEF. However, other means may also be used, such as a cholesteric filter associated with a quarter-wave plate, a volume holographic film operating at the Brewster conditions for the various layers.

In the description, the means used to convert linear polarisation into quasi-circular polarisation consists of a quarter-wave plate. However, it is obvious to those skilled in the art that other means may be used, namely means which use birefringence, such as natural birefringent materials (e.g.: mica), artificial birefringent materials (PMMA film or other plastic films obtained by drawing) and means using reflection, such as total internal reflection (TIR) in glass (since the phase shift depends on the angle of incidence and is around 45°, two internal reflections are necessary to obtain circular polarisation from 45° linear polarisation).

In the above embodiment, the light beam passes through the quarter-wave plate four times. In the event that the correction of the phase shift is not sufficient or optimal for all wavelengths or angles of incidence, and according to a further characteristic of the present invention, a precorrection retarder plate can be added on exit from the projection objective. The latter will be chosen in such a way as to add or subtract a very particular delay value depending on the direction in space of each ray emitted by the exit pupil of the projection objective. This correction can be made inside the projector, more particularly it is possible to place a retarder plate, with a delay depending on position on the LCD valve, after the analyser.

Various improvements can be made to the embodiment described above.

In order to eliminate stray images due to the rays transmitted by the polarising filter 9, especially during the first reflection, an absorbing polariser 10 is positioned at the output of the reflective linear polarising filter 9. In this case, the passing axis of the absorbing polariser is parallel to the passing axis of the reflective linear polarising filter 9. This new polariser absorbs the light transporting the stray images. It makes it possible to increase the contrast of the projector when the latter is placed in bright surroundings such as an illuminated room. Thus, the light polarised linearly by the reflective linear polarising filter 9 is transmitted through the reflective filter, while the unpolarised natural light is firstly half absorbed by the absorbing polariser. The other half passes through this polariser and is partly reflected off the screen and again transmitted by the reflective and absorbing polarisers, thus undergoing a total attenuation of at least 25%. This makes it possible to improve the contrast of the images by a factor of 3 by comparison with a projector having no absorbing polariser at the exit of the screen.

Figure 3:
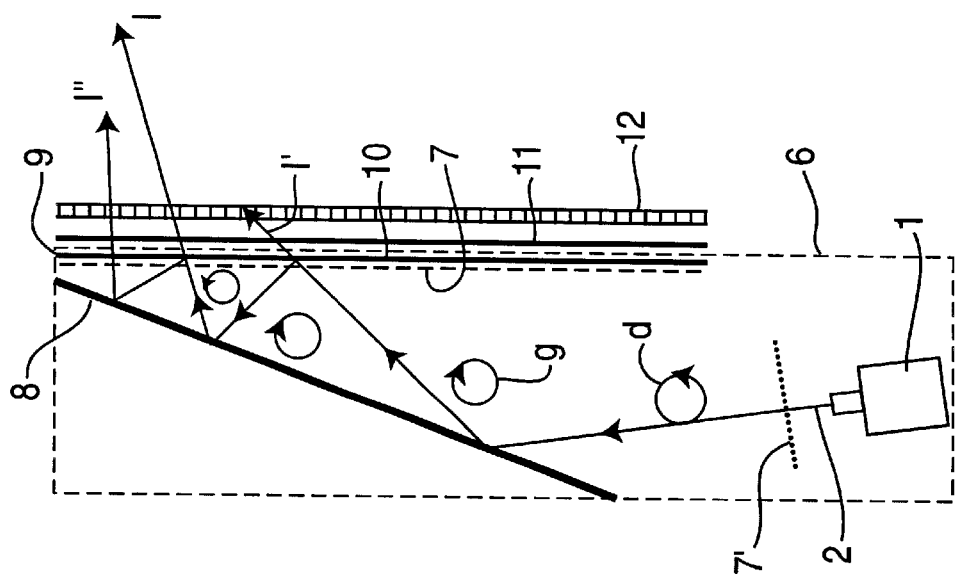
FIG. 3 is a schematic sectional view of the embodiment of FIG. 2 on which a shutter film has been placed.

According to another characteristic represented in FIG. 3, a shutter filter 12 is positioned at the exit of the screen 11. The purpose of this shutter filter is to absorb the stray images such as I' and I" obtained from successive reflections of the light beam inside the chassis. Thus, the ghost images mix with the final image and disturb the appearance of the image, causing a loss of contrast.

The shutter film 12 placed at the exit of the screen is adapted to the image ray I at each point of the image and absorbs the rays carrying the stray images, essentially the first stray image I'. Such a film is manufactured by the 3M company under the name "Light control film". The film used has a low angular acceptance, for example of ±6 degrees centred on a mean angle of incidence which varies as a function of the location at which it is placed on the projection screen. With such a film, the transmission in the useful band is of the order of 75% whilst the beams outside this band are absorbed by the structure. By a geometrical calculation it can be shown that it is possible, in the case described above, for the image beam (I) to be angularly separated from the stray beam (I'). This angular separation, at least equal to the angle between the polariser (the screen) and the mirror, is such that the shutter films work for this application, provided that the values of the inclination of the shutter films are adapted at each screen location. This variation is effected in x and in y.

The use of a shutter film also makes it possible to improve the contrast of the image in view the external stray rays originating from the mean illumination of the room in which the projector is placed.

What is claimed:

1. A projection system comprising:

a source of projected quasi-circular polarized light beam;

a screen; and means for directing the quasi-circular polarized light beam onto the screen, said means for directing comprising:

a mirror firstly reflecting said quasi-circular polarized light beam arriving from said source;

means for converting linear polarization into quasi-circular polarization; and a reflective linear polarizing filter;

said means for converting linear polarization, said reflective linear polarizing filter and said screen being an assembly in that order and the light beam firstly reflected from the mirror being reflected off the reflective filter back to the mirror from which the light beam is again reflected and then directed onto the screen.

2. System according to claim 1, wherein if the light beam from the projector is linearly polarized it passes through a second means for converting linear polarisation into quasi-circular polarisation.

3. System according to claim 2, wherein the second means makes an angle with an optical axis of the light beam.

4. System according to claim 1, wherein the second means for converting linear polarisation into quasi-circular polarization is adhesively bonded or laminated to said reflective linear polarizing filter.

5. System according to claim 1, wherein the means for converting linear polarisation into quasi-circular polarisation comprises a quarter-wave plate.

6. System according to claim 1, further comprising an absorbing linear polarizing filter positioned at the output of the reflective linear polarizing filter, the passing axis of the absorbing filter being parallel to the passing axis of the reflective filter.

7. System according to claim 1, further comprising a shutter film positioned at the exit of the screen, said film exhibiting a small angular acceptance and being created on a mean angle of incidence which varies as a function of position on the screen.

* * * * *